A. C. EGGERS.

Assignor, by direct and mesne assignments, to the IDEAL RUBBER COMPANY.

NURSING BOTTLE NIPPLE.

No. 11,086. Reissued June 17, 1890.

WITNESSES:

Fol. N. Rosenbaum.

Martin Petry.

INVENTOR:

Anton C. Eggers

BY

Gopel & Paegener

ATTORNEYS

UNITED STATES PATENT OFFICE.

ANTON C. EGGERS, OF BROOKLYN, NEW YORK, ASSIGNOR, BY DIRECT AND MESNE ASSIGNMENTS, TO THE IDEAL RUBBER COMPANY, OF SAME PLACE.

NURSING-BOTTLE NIPPLE.

SPECIFICATION forming part of Reissued Letters Patent No. 11,086, dated June 17, 1890.

Original No. 411,794, dated October 1, 1889. Application for reissue filed April 29, 1890. Serial No. 349,967.

*To all whom it may concern:*

Be it known that I, ANTON C. EGGERS, of Brooklyn, in the county of Kings and State of New York, have invented certain new and useful Improvements in Nursing-Bottle Nipples; and I do hereby declare the following to be a full, clear, and exact description of the invention, that will enable others skilled in the art to which it appertains to make and use the same.

This invention relates to an improved nipple for nursing-bottles, by which atmospheric air is admitted to the interior of the bottle while the same is used by the infant for drinking, so that the vacuum in the same is destroyed; and the invention consists of a nipple for nursing-bottles, which is provided with a stopper within the nipple-cap, said stopper fitting into the mouth of the bottle and having a vent-channel passing through the stopper, said channel having a valve at the inner end, which is made integral with the nipple.

The invention consists, further, of a nipple having an elastic cap, a stopper within said cap, said stopper fitting into the mouth of the bottle, a vent-channel passing through the stopper and having a valve at the inner end, and an exterior guard-shield above the cap, said shield being made integral with the nipple.

Figure 1:
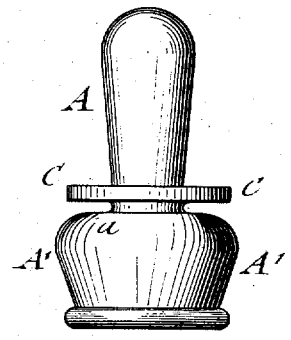
Figure 2:
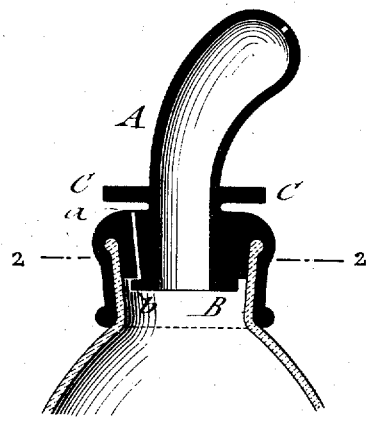
Figure 3:
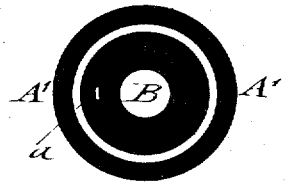

In the accompanying drawings, Figure 1 represents a side elevation of my improved nipple for nursing-bottles. Fig. 2 is a vertical central section of the same, shown as applied to a bottle and provided with a vent-channel in the interior stopper of the nipple; and Fig. 3 is a horizontal section on line 2 2, Fig. 2.

Similar letters of reference indicate corresponding parts.

A in the drawings represents a nipple of soft rubber, which is provided at the interior of the elastic cap A′, by which it is applied to the bottle-mouth, with a tubular stopper B, that fits into the mouth of the nursing-bottle, so as to tightly close the same. Above the cap A′ of the nipple is arranged a guard-shield C, which is made integral with the nipple. A vent-channel *a* extends through the interior stopper B, and is provided at its inner end with a flap-valve or tongue *b*, that closes the vent-channel *a* when no pressure is exerted on the same, while it opens the vent-channel whenever, by the partial vacuum formed in the bottle, the pressure of the atmosphere opens the same. The vent-channel *a* communicates with the atmosphere at the outer end, and is molded into the nipple while the same is in the course of manufacture. The guard-shield C protects the outer opening of the vent-channel against being closed by the lips, and secures the proper working of the vent. By the arrangement of the guard-shield above the cap the proper function and operation of the vent-channel cannot be interfered with by the lips, so that the reliable action of the vent-channel and of its valve is secured. The vent which is thus given to the interior of the bottle destroys the vacuum formed in the same by the gradual withdrawing of the liquid by the infant, and facilitates thereby the act of drinking from the nursing-bottle.

I am aware that nursing-bottles, stoppers, and other structures provided with valved vent-channels are well known, and I do not claim this feature, broadly; neither do I claim a stopper having a valved vent-channel, in which the valve is made integral with the stopper.

Having thus described my invention, I claim as new and desire to secure by Letters Patent—

1. A nipple for nursing-bottles, provided with an exterior elastic cap, an interior tubular stopper having a vent-channel passing through said stopper, and a valve at the inner end of the vent-channel, said valve being made integral with the nipple, substantially as set forth.

2. A nipple for nursing-bottles, provided with an exterior elastic cap, an interior tubular stopper having a vent-channel passing through the same, a valve at the inner end of the vent-channel, and a guard-shield above the stopper, said valve and guard-shield being made integral with the nipple, substantially as set forth.

ANTON C. EGGERS.

Witnesses:
PAUL GOEPEL,
W. REIMHERR.